United States Patent [19]

Larsson

[11] 3,946,611
[45] Mar. 30, 1976

[54] TIME-TEMPERATURE INTEGRATING INDICATOR
[75] Inventor: Raymond P. Larsson, Denville, N.J.
[73] Assignee: Bio-Medical Sciences, Inc., Fairfield, N.J.
[22] Filed: May 14, 1974
[21] Appl. No.: 469,851

[52] U.S. Cl. ................. 73/356; 73/358; 116/114.5
[51] Int. Cl.² ..................................... G01K 11/12
[58] Field of Search ............... 73/356, 358, 339 R; 116/114.5, 114; 426/88

[56] References Cited
UNITED STATES PATENTS
2,552,477  5/1951  Cole ................................. 73/339 R
2,671,028  3/1954  Clark ............................... 116/114.5
3,414,415  12/1968  Broad, Jr. ........................ 116/114.5

Primary Examiner—Richard E. Aegerter
Assistant Examiner—Willis Little
Attorney, Agent, or Firm—Anthony Lagani, Jr.

[57] ABSTRACT

The temperature history of a product is visually displayed as a color front on an indicator, the distance of front advancement being a function of the temperature time integral. The indicator measures the gas generation in a first compartment by a wick in a second compartment, the wick also being in communication with the first compartment. Optionally, a gas permeable film separates the gas generating material and the wick.

15 Claims, 4 Drawing Figures

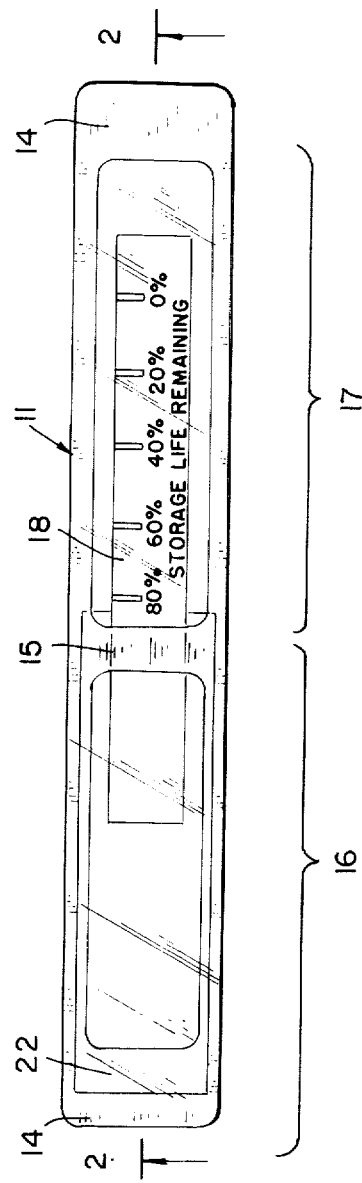
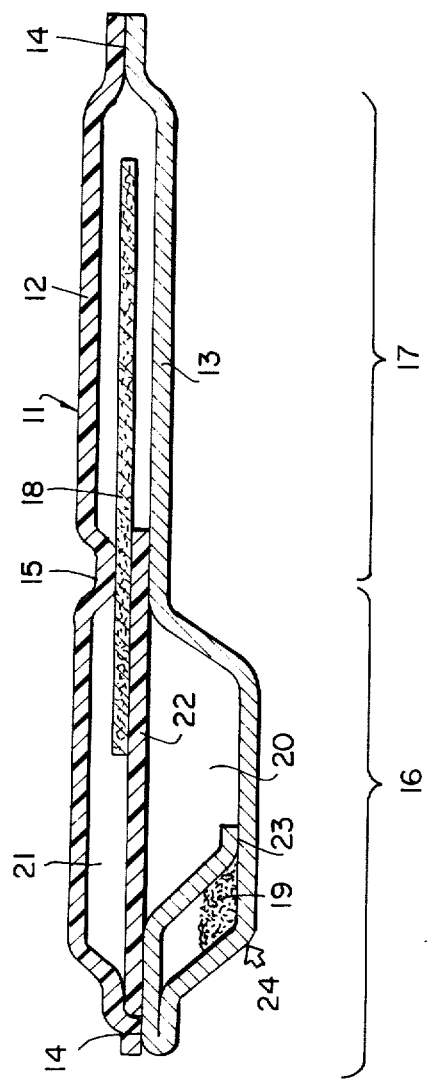

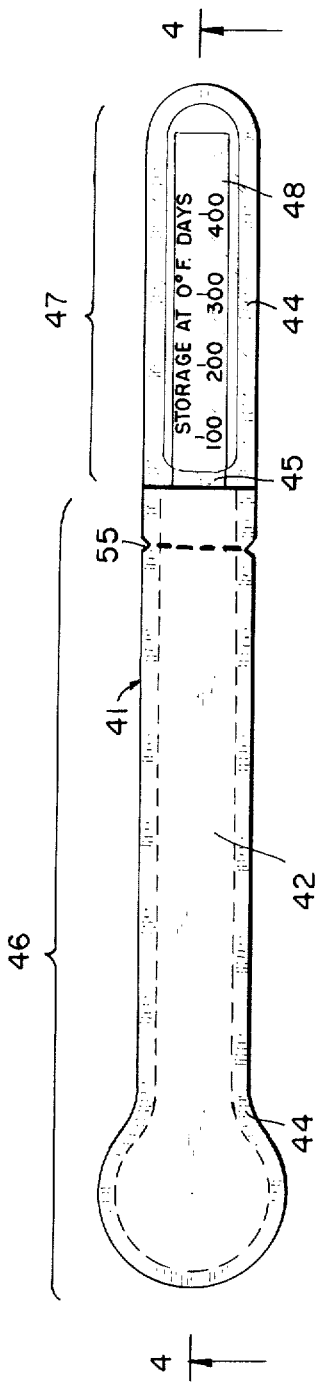
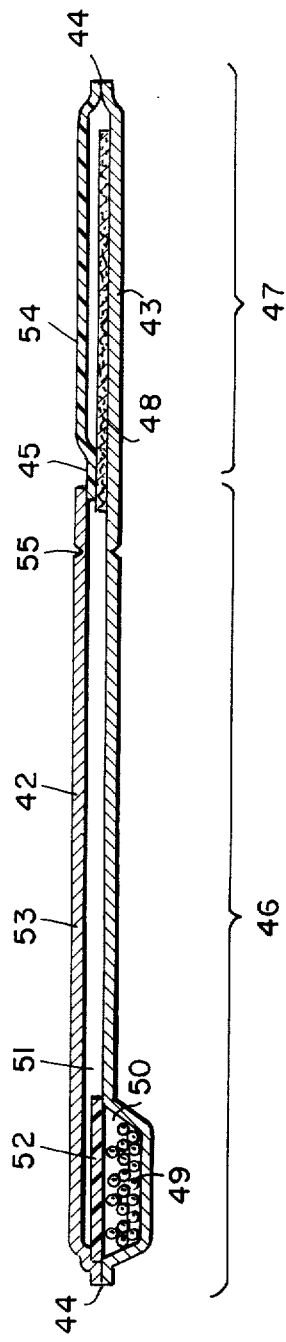
FIG. 3
FIG. 4

TIME-TEMPERATURE INTEGRATING INDICATOR

DETAIL DESCRIPTION

The present invention pertains to an indicator system which visually displays the time-temperature integral to which a product has been exposed.

The desirability of detecting whether or not a frozen product has been allowed to thaw has long been recognized and numerous tell-tale devices are described in the literature. One class of these relies upon material which is frozen but which melts at some preselected temperature so as to irreversibly activate an indicator, either chemically or physically. Typically of these devices are those described in the following U.S. Pat. Nos.:

| Nos. 1,917,048 | Nos. 2,753,270 | Nos. 2,955,942 |
|---|---|---|
| 2,216,127 | 2,762,711 | 3,047,405 |
| 2,277,278 | 2,788,282 | 3,055,759 |
| 2,340,337 | 2,823,131 | 3,065,083 |
| 2,553,369 | 2,850,393 | 3,194,669 |
| 2,617,734 | 2,852,394 | 3,362,834 |
| 2,662,018 | 2,951,405 | 3,437,010 |

All of the above devices merely signal "thaw" with no attempt to measure the period during which the product is thawed or the temperature which the product attains while thawed.

A second class of known indicators utilizes diffusion or capillary action of a liquid on a wick or similar permeable member. These devices while often cumbersome, provide some degree of gradation and are typified by the devices of the following U.S. Pat. Nos.:

| Nos. 2,560,537 | Nos. 3,243,303 |
|---|---|
| 2,716,065 | 3,414,415 |
| 2,951,764 | 3,479,877 |
| 3,118,774 | |

The majority of the prior art devices however are directed primarily at the phenomenon of thawing and the attendant damage which occurs. It is now recognized that various natural and synthetic materials deteriorate with the passage of time even when taking the precaution of storing under adequate refrigeration. This is true even with such additional or alternative precautions as packaging in an inert atmosphere, sterilization or adding spoilage retardants. Thus, for example, foods, films, pharmaceuticals, biological preparations and the like, can demonstrate decomposition with the passage of time, even when sterilized or maintained at sufficiently low temperatures to preclude microbiological degradation. Such decomposition occurs for various reasons, including strictly chemical reactions, such as oxidation, and enzymatic processes. Frozen foods and ice cream show deterioration even when held in a frozen state. A system which would monitor such decomposition or deterioration would be extremely valuable.

The deterioration kinetics involved in such processes however, are exceedingly complex. For example, while it is clear that deterioration is a function of temperature, the rate of this deterioration of such products can also vary with temperature. One rate of deterioration will exist at a first temperature while a different rate obtains at a second temperature. The total amount of deterioration will depend upon the time at which the product is held at each temperature; i.e., the integral of time and temperature.

The quotient of (a) the rate of change at one temperature of an article's property whose deterioration is being monitored to (b) the rate of change at a lower temperature is often expressed for 10° increments and represented by the symbol "$Q_{10}$" for the Celsius scale and "$q_{10}$" for the Fahrenheit scale. This quotient is substantially constant within limited temperature ranges.

The practical effect of the foregoing can be seen for example from two comparable samples of frozen food which are processed and packaged at the same time. If in the course of distribution or storage one package is allowed to rise in temperature by 10° or 20°C, even without thawing, its life will be reduced as compared with the other package which was maintained at a lower temperature for its entire storage life since the rate of decomposition of the contents of the first package is accelerated during the storage at the higher temperature. A consumer about to purchase these packages, both of which are now stored at normal freezer temperature, has no way of ascertaining this difference in temperature histories.

Systems have been suggested for monitoring the temperature history of a product. This U.S. Pat. No. 2,671,028 utilizes an enzyme such as pepsin in indicator systems while U.S. Pat. No. 3,751,382 discloses an enzymatic indicator in which urease decomposes urea with the reaction products causing a change in the pH of the system. The activity of the enzyme, and thus rate of decomposition, is dependent on temperature so that the change in pH resulting from this decomposition can be monitored by conventional acid-base indicators. This type of system, which appears to be directed at the specific problem of microbiological putrefaction rather than the broader problem of monitoring temperature histories, suffers from the inherent limitation of any enzymatic reaction. Thus while enzyme activity is a function of temperature, it is also sensitive to the very passage of time being measured, enzymatic activity generally decreasing with time. Enzyme activity is also sensitive to pH change and such change is the operative factor in, for example, the system of U.S. Pat. No. 3,751,382. A more sophisticated system is described in U.S. Pat. No. 3,768,976 in which time temperature integration is achieved by monitoring permeation of oxygen from the atmosphere through a film, utilizing a redox dye to provide a visual read out. This device is however dependent upon the presence of atmospheric oxygen and somewhat cumbersome in configuration and dimensions.

A further problem is that the change in rate of quality loss per unit of temperature change differs for different products. Thus the change in the rate of deterioration per unit of temperature change for certain fruits and berries is vastly different from the change in rate for lean meats. The values for dairy products are different from both. For example, within the range of 0° to −20°C, raw fatty meat and pre-cooked fatty meat have $Q_{10}$'s of about 3, whereas raw lean meat and precooked lean meat have $Q_{10}$'s between 5 and 6. Vegetables generally have a $Q_{10}$ of between 7 and 8, whereas fruits and berries have a $Q_{10}$ of approximately 13. Consequently, a system which is dependent on a single enzymatic reaction or the permeability of a given film will be suitable as an indicator only for those materials having a similar slope for their relationship of change of rate of decomposition to temperature. Although U.S. Pat. No. 3,751,382 describes a method for modifying the time at which the indicator's color change occurs, the activation energy of the enzyme system is modified only slightly and the ratio of change in reaction rate per temperature unit remains substantially the same. The same is true of the device described in U.S. Pat. No. 3,768,976 which is dependent solely on gas permeability.

The present invention pertains to an indicator system which overcomes the above problems yet is extremely simple and reliable in structure and operation. Moreover, the device is extremely well suited for remote sensing; i.e., monitoring the time-temperature integrals at the interior of a package, while providing an immediate read-out of that integral on the exterior of the package.

The present system is not limited in application to monitoring long storage periods at low temperatures. The same considerations apply to short periods and to high temperature. The present system can also be used to insure, for example, that products have been adequately heat sterilized. The indicator is thus admirably suited to insure that canned goods which are autoclaved have been subjected to the appropriate time-temperature integral required to obtain a necessary degree of microrganism kill. In this case, the indicator provides visual information as to whether the necessary parameters of temperature and time have been reached or exceeded. Similarly, the present indicator can be used to insure that surgical instruments have been subjected to appropriate sterilization conditions, that pharmaceuticals have not been stored for periods in excess of that which is permissible, that dairy products have been properly pasteurized, and the like. Various other applications in which it is desirable to know the temperature history of a product are immediately apparent.

The present invention will be described in conjunction with the appended drawings in which:

FIG. 1 is a plan view of one embodiment of the present embodiment;

FIG. 2 is a cross-section of the embodiment of FIG. 1 taken along line 2—2 of FIG. 1;

FIG. 3 is a plan view of a further embodiment according to the present invention; and FIG. 4 is a cross-section of the embodiment shown in FIG. 3 taken along line 4—4 of FIG. 3.

Referring now in greater detail to FIGS. 1 and 2, the time-temperature integrating indicator includes a sealed envelope shown generally at 11 which is constructed by sealing upper wall 12 to the lower wall 13 about their periphery 14. Upper wall 12 and lower wall 13 are of like or different materials which are substantially impermeable to gas, as described in greater detail below. In the embodiment shown in FIG. 2, upper wall 12 is composed of a transparent gas impermeable material such as a laminate of heat sealable polyethylene and trifluoromonochloropolyethylene. Other materials which are gas impermeable, such as coextruded polyvinylidene chloride and polyethylene or a two layer film of polyester and polyethylene can similarly be employed. Bottom wall 13, in the embodiment of FIGS. 1 and 2, can be a foil, such as aluminum foil, a polymer or a laminate.

In addition to the seal about the periphery 14 of envelope 11, upper wall 12 and lower wall 13 are sealed transversely at some intermediate position by cross-seal 15. Cross-seal 15 divides the envelope into first and second compartments, shown generally at 16 and 17, respectively. The position and configuration of the cross-seal is relatively unimportant and can be varied widely, as disclosed below. The upper and lower walls can be flexible or rigid.

Extending longitudinally from first compartment 16 to second compartment 17 of envelope 11 is wick means 18 which serves as the only means of gas communication across cross-seal 15. Thus cross-seal 15 must effectively prevent gas transport from first compartment 16 to second compartment 17 other than through wick means 18 within cross-seal 15.

Disposed within first compartment 16 of envelope 11 is a gas generating material 19. A wide variety of different chemical systems can be employed as the gas generating material and indeed the wide latitude in selection of the gas generating material contributes greatly to the versatility of the present device. Optionally, first compartment 16 can be divided into a first chamber 20 and a second chamber 21 by a gas permeable film 22. Film 22 may serve merely as a mechanical separator between gas generating material 19 and wick means 18, in which case the permeability of film 22 to gas should be substantially temperature independent. Alternatively, and preferably, the permeability of film 22 to gas is temperature dependent and this dependency thus contributes to the response of the device in time-temperature integration.

Gas generating material 19 can be isolated from wick means 18 prior to use through incorporation of a frangible shield, as for example by forming a loop of bottom wall 13 which is weakly bonded to itself as at 23. A small amount of physical pressure behind seal 23, as for example at 24, results in the rupture of seal 23, and the communication of gas generating material 19 with first chamber 20 of first compartment 16.

Upon rupture of seal 23, and after an initial induction period during which the partial pressure of the gas rises in chamber 20, the gas permeates across film 22 into second chamber 21 of first compartment 16. The gas is then absorbed into wick 18, passing through cross-seal 15 from first compartment 16 to second compartment 17. The rate of gas generation by material 19 is a function of temperature and the amount of gas which thus passes through cross-seal 15 is in turn a function of temperature. If wick 18 is constructed with a substantially constant cross-section, the distance which the gas advances along wick means 18 from cross-seal 15 will thus be a direct function of the time-temperature integral to which the device has been subjected.

Deposited on wick 18 is an indicator composition which produces a color change in the presence of the gas generated by gas generating material. This indicator composition can vary widely but is selected so as to be responsive to the particular gas generated by gas generating material 19. Since this indicator composition produces a color change in the presence of the gas, an advancing front will be observed on wick means 18 in second compartment 17. The length of advancement corresponds to the time-temperature integral to which the device has been exposed and can be read through the incorporation of a graduated scale and appropriate indicia associated with the wick means.

Referring now to FIGS. 3 and 4, there is shown envelope 41 of an alternative configuration. Upper wall 41 is sealed to lower wall 43 around its periphery 44 and the envelope is divided by cross-seal 45 into the first compartment 46 and second compartment 47. In this instance, the cross-seal is disposed towards one end of the envelope so that the indicating elements in compartment 47 are remote from the sensing elements and a long channel is provided in compartment 46. Wick means 48 extends from first compartment 46 to second compartment 47 through cross-seal 45. Gas generating material 49 is carried within first chamber 50 of first compartment 46 and separated from second chamber 51 by gas permeable film 52.

In lieu of a mechanical barrier, gas generating material 49 is isolated from wick 48 prior to use by encapsulation, the details of which being well known to the art need not be elaborated here. Upon fracturing the protective coating around the individual particles of the encapsulated material, which fracturing can be done mecanically or in the course of subjecting the particles to low temperatures, gas generation begins. The gas passes through permeable film 52 into second chamber 51 of first compartment 46 and then through cross-seal 45 by means of wick means 48.

As noted above, and in contrast to the device shown in FIGS. 1 and 2, wick means 48 are remote from the sensing portion of the device. Gas, upon passage through permeable film 52, readily migrates through the second chamber and is absorbed in that portion of wick means 18 which extends past cross-seal 45 into first compartment 46. As a result of this arrangement, it is possible to place the sensing portion of the indicator deep within the interior of the product being monitored and at the same time place the indicating portion of the device on the exterior surface for ease of reading. This is in contrast to many of the known devices which can only be affixed to the outside of the product and thus can monitor only the surface temperature of the product. Prior art devices which have attempted to monitor the inside of a product generally rely on mechanical means such as a spring or a liquid carrying wick. The former is subject to mechanical failure while the latter requires a large volume of liquid.

In addition, the embodiment of FIGS. 3 and 4 utilizes a two component upper wall. This upper wall 42 has a first portion 53 of foil which is sealed to the second portion 54 of transparent, gas impermeable polymer. This is desirable particularly for applications which require measurements over a long period of time, since the foil has a much lower gas permeability than most polymers. The prevention of loss of gas by transport through either the upper or lower wall is most important within the first compartment of the envelope and this arrangement thus minimizes this problem while providing a transparent window for inspection of wick 48.

The embodiment of FIGS. 3 and 4 also includes an area 55 of weakened wall cross-section. This permits the removal of the indicating portion of the device by simply tearing the envelope along the weakened wall portion. This separation immediately terminates gas passage to wick means 48 and results in a permanent, irreversible record of the time-temperature history of the indicator up to the moment of separation. This permanent record can thus be retained for various administrative purposes, or could for example, be returned to the manufacturer or distributor to substantiate a product complaint.

The gas generation component can utilize a variety of physical or chemical processes. In its simplest embodiment, the gas generation may involve simple sublimation or vaporization and thus one may utilize any substance which has a high vapor pressure, as for example, water (or ice); iodine; aliphatic and aromatic alcohols such as thymol; hydrogen peroxide; lower alkanoic and aromatic acids, such as acetic acid; acid anhydrides such as maleic anhydride; acid halides; ketones; aldehydes and the like. Alternatively, the gas generating material can be a salt which decomposes with the generation of a gas, as for example ammonium carbonate, sodium bicarbonate, ammonium acetate, ammonium oxalate, ammonium formate and the like.

In those instances in which the rate of gas generation corresponds to the rates being monitored, it is unnecessary to include the barrier film and the first compartment of the envelope can have a single chamber. Even in such embodiments however, it is often desirable to interpose a highly permeable physical barrier which separates the gas generating material from the wick. The permeability of such barriers should be substantially independent of temperature since the rate determining step is the generation of gas. Typical of these are such materials as microporous polypropylene (Celgard) and microporous acrylic polyvinyl chloride on woven nylon cloth (Acropor). When no film is employed, or the film is highly permeable, the rate of sublimation is in part dependent on the available surface area of the gas generating material. In such instances, it is often desirable to impregnate the material on a carrier so that a uniform surface is provided.

Alternatively the film which divides the first compartment into the first and second chamber has a more limited gas permeability and one which is temperature dependent. Typical of these are polyethylene, polypropylene, nylon, cellulose films and the like. It can be shown mathematically that the contribution of the gas generation and the contribution of gas transport to the $Q_{10}$ of the system are cumulative so that by judicious selection of the two systems it is possible to achieve an overall effect in which the change in rate of gas availability at the wick with changes in temperature parallels the $Q_{10}$ of the product being monitored. Moreover, when a film of limited permeability is utilized, the effect of surface area of the gas generating material is eliminated since gas transport across the film is the rate controlling step.

The gas generation process and optionally also the permeability through the film are thus selected so that the change in rate of gas availability at the wick per unit change in temperature approximates the $Q_{10}$ of the product being monitored. The activation energy values of the operative components are useful in this selection since the relationship between $Q_{10}$ and the activation energy is as follows:

$$Q_{10} = e^{10 E_a / T_1 \cdot T_2 \cdot R} \qquad (1)$$

where $E_a$ = the activation energy
$T_1$ = a first temperature in degrees (absolute)
$T_2$ = a second temperature 10° lower than $T_1$ and
$R$ = the gas constant Within, for example, the range of −10° to −20°C, an important region for frozen foods, the following values are obtained:

| $E_a$ Kcal/mole | $Q_{10}$ | $q_{10}$ | $E_a$ Kcal/mole | $Q_{10}$ | $q_{10}$ |
|---|---|---|---|---|---|
| 0.0 | 1.00 | 1.00 | 20.0 | 4.54 | 2.31 |

| $E_a$ Kcal/mole | $Q_{10}$ | $q_{10}$ | $E_a$ Kcal/mole | $Q_{10}$ | $q_{10}$ |
|---|---|---|---|---|---|
| 5.0 | 1.46 | 1.23 | 22.0 | 5.28 | 2.52 |
| 8.0 | 1.83 | 1.40 | 25.0 | 6.63 | 2.86 |
| 10.0 | 2.13 | 1.52 | 27.0 | 7.71 | 3.11 |
| 12.0 | 2.48 | 1.66 | 30.0 | 9.61 | 3.52 |
| 15.0 | 3.11 | 1.88 | 33.0 | 12.1 | 4.00 |
|  |  |  | 34.0 | 13.0 | 4.16 |

It is thus possible to select gas generating materials and films in which the rates of gas generation and permeability parallel the decomposition rates of various materials, even in the course of temperature fluctuation over a period of time.

The wick means can be selected from a wide variety of known materials. These may be simple cellulosic products such as paper or fiber, various synthetic polymeric materials, such as polypropylene, polyesters, or polyamides, glass fiber paper, alumina, silica gel and the like. The nature of the wick means is relatively unimportant, provided it possesses a sufficient affinity for the gas and indicator composition and is substantially inert to both.

The indicating composition which is deposited on the wick means and which results in a color change in the presence of gas can be a single component or a mixture of components operating together. The particular indicating composition must be selected for the particular gas generated. When, for example, the gas generated is ammonia, the indicator composition can simply include an aqueous medium and a pH sensitive dye, such as methyl red or thymol blue, and an acidic substance of low volatility such as trichloroacetic, benzoic, oxalic or the like acid. Prior to absorption of any ammonia, the dye will display its first color which color will change as ammonia is absorbed. Analogous systems are employed with acidic gases.

The indicating composition can alternatively use a redox system to produce the requisite color change. For example, the wick may be impregnated with a potassium permanganate solution. In such an instance, the gas or vapor generated is one which is susceptible to oxidation, as for example thymol or another oxidizable alcohol. As the thymol is absorbed on the wick and advances along its length, it is oxidized by the permanganate which in turn loses its characteristic red color.

It is also possible to utilize an indicator composition which while not responding to the gas directly, converts it to a material which can be monitored. Thus, for example, in the case of maleic anhydride, the wick may be impregnated with an aqueous base or with an alcohol serving as a solvolysis agent. As the anhydride is absorbed in the wick, it is hydrolyzed by the water or alcohol with the generation of maleic acid. This acid can then be monitored by incorporation in the composition of a pH sensitive dye.

The indicator composition can also complex the gas, as with potassium iodine and starch for iodine gas.

The following examples will serve to typify other systems and configurations but should not be construed as a limitation on the scope of the present invention, the invention being defined only by the appended claims.

EXAMPLE 1

A time-temperature integrating indicator is prepared in a configuration similar to that shown in FIGS. 1 and 2. The upper wall is a laminate of 2 mil polyethylene and 1 mil trifluorochloropolyethylene while the bottom wall is 1 mil aluminum foil laminated to 1 mil polyethylene. The gas permeable film is 2 mil polyethylene having an available area of 1 sq. inch. The gas generating material is ammonium carbonate. The wick is Whatman No. 1 filter paper having a width of 0.5 inch. The indicator composition is 0.05 molar aqueous trichloroacetic acid, 20% by volume glycerol and 0.1% methyl red.

Upon activation and equilibration, the ammonia generated by the ammonium carbonate migrated through the polyethylene film and produces a color change in the wick. At −18°C, the front advances at a rate of 0.017 mm/hr. If the sensor is held at −1°C, the front advances at a rate of 0.15 mm/hr. The change in the rate with 10°C increments corresponds to a $Q_{10}$ of 3.7.

EXAMPLE 2

An indicator is prepared as above utilizing however iodine as the gas generating material. The indicator composition consists of 10% potassium iodine and 0.1% starch. At −1°C, the front advances at 0.033 mm/hr while at 22°C, the front advances at 0.15 mm/hr, corresponding to a $Q_{10}$ of from 2.5 to 3.0.

EXAMPLE 3

An indicator is prepared in a configuration similar to that shown in FIGS. 3 and 4 omitting however the film. Paraformaldehyde is employed as the gas generating material. The indicator composition consists of 1.1 molar hydroxylamine hydrochloride, 0.8 molar sodium acetate and 0.1% bromphenol blue and thymol blue. At −18°C, the front advances at a rate of 0.065 mm/hr while at 10°C, the front advances at 0.12 mm/hr, corresponding to a $Q_{10}$ of 1.5.

EXAMPLE 4

An indicator is prepared in a configuration similar to that shown in FIGS. 3 and 4, omitting however the film. Thymol is utilized as the gas generating material. The wick is glass fiber paper which is impregnated with 0.01 molar potassium permanganate. A brownish yellow front advances along the initially red strip at a rate of 0.06 mm/hr at 21°C and 0.0002 mm/hr at −1°C, corresponding to a $Q_{10}$ of about 5.

EXAMPLE 5

An indicator is prepared as in Example 3. Maleic anhydride is employed as the gas generating material to give a $Q_{10}$ of approximately 4. The indicator composition comprises 0.1M octadecanol, which hydrolyzes the anhydride, and a wide range pH indicator such as lacmoid.

EXAMPLE 6

An indicator is prepared as in Example 1, utilizing glacial acetic acid as the gas generating material. This is sealed below a 2 mil film of polyethylene. The indicator composition comprises 0.1 molar sodium hydroxide, together with 0.1% thymol blue. The initially blue strip demonstrates a sharp yellow front advancing at a rate of 0.02 mm/hr at −18°C and 0.25 mm/hr at 4.5°C, corresponding to a $Q_{10}$ of 3.1.

EXAMPLE 7

An indicator is prepared as deposited in Example 1. Prior to sealing the upper and lower walls, an opaque polyethylene mask is interposed between the wick and upper wall. The mask has one opening over that portion of the wick in compartment 16 which opening bears the indicia "Active if red". A series of openings are regularly spaced over that portion of the wick in compartment 17 with appropriate indicia associated with each opening. This provides an initial signal to show activation and converts the indicator read-out to a digital system.

What is claimed is:

1. A temperature time integrating indicator comprising:
   a. a sealed envelope having upper and lower walls, each of a gas impermeable material, the walls being sealed about their periphery, a wick means interposed longitudinally between said walls, said upper wall having a transverse seal at an intermediate position thereof, said seal sealing said upper wall to the wick means and to the lower wall in the area laterally adjacent said wick means thereby defining first and second compartments within the envelope, said compartments being interconnected at the wick means area only, said first compartment being divided into a first and second chamber by a gas permeable film interposed between said upper and lower walls of said envelope;
   b. a gas generating material in the first chamber of the first compartment;
   c. wick means extending from the second chamber of the first compartment into the second compartment, said wick means being the only means of gas communication across said cross-seal; and
   d. an indicator composition deposited on said wick, said indicator composition producing a color change in the presence of the gas generated by said gas generating material.

2. A temperature time integrating indicator according to claim 1, wherein the permeability of said film to gas is substantially temperature independent.

3. A temperature time integrating indicator according to claim 1 wherein the permeability of said film to gas is temperature dependent.

4. A temperature time integrating indicator according to claim 1 including a frangible shield means operable to isolate said gas generating material from said wick prior to use.

5. A temperature time integrating indicator according to claim 1 wherein said gas generating material generates a gas wherein said gas is an acidic gas or a basic gas.

6. A temperature time integrating indicator according to claim 5 wherein the gas generated is ammonia.

7. A temperature time integrating indicator according to claim 1, wherein the indicator composition complexes the gas generated.

8. A temperature time integrating indicator according to claim 1 wherein said gas is susceptible to chemical reduction and said indicator composition includes a redox system operable to reduce said gas.

9. A temperature time integrating indicator according to claim 1 wherein said gas is susceptible to solvolysis with the generation of a material wherein said material is an acidic material or a basic material and said indicator composition includes a solvolysis agent operable to effect solvolysis of said gas.

10. A temperature time integrating indicator according to claim 9 wherein said gas is a sublimable acid anhydride and said solvolysis agent is water or an alcohol.

11. A temperature time integrating indicator according to claim 1 wherein said gas is susceptible to chemical oxidation and said indicator composition includes a redox system operable to oxidize said gas.

12. A temperature time integrating indicator according to claim 7 wherein the gas generating material is ammonia carbonate.

13. A temperature time integrating indicator according to claim 1 wherein the gas permeable film is polypropylene.

14. A temperature time integrating indicator according to claim 6 wherein the gas generated is acetic acid.

15. A temperature time integrating indicator according to claim 1 wherein the gas impermeable material is a laminate of heat sealable polyethylene and trifluoromonochloropolyethylene.

* * * * *